UNITED STATES PATENT OFFICE.

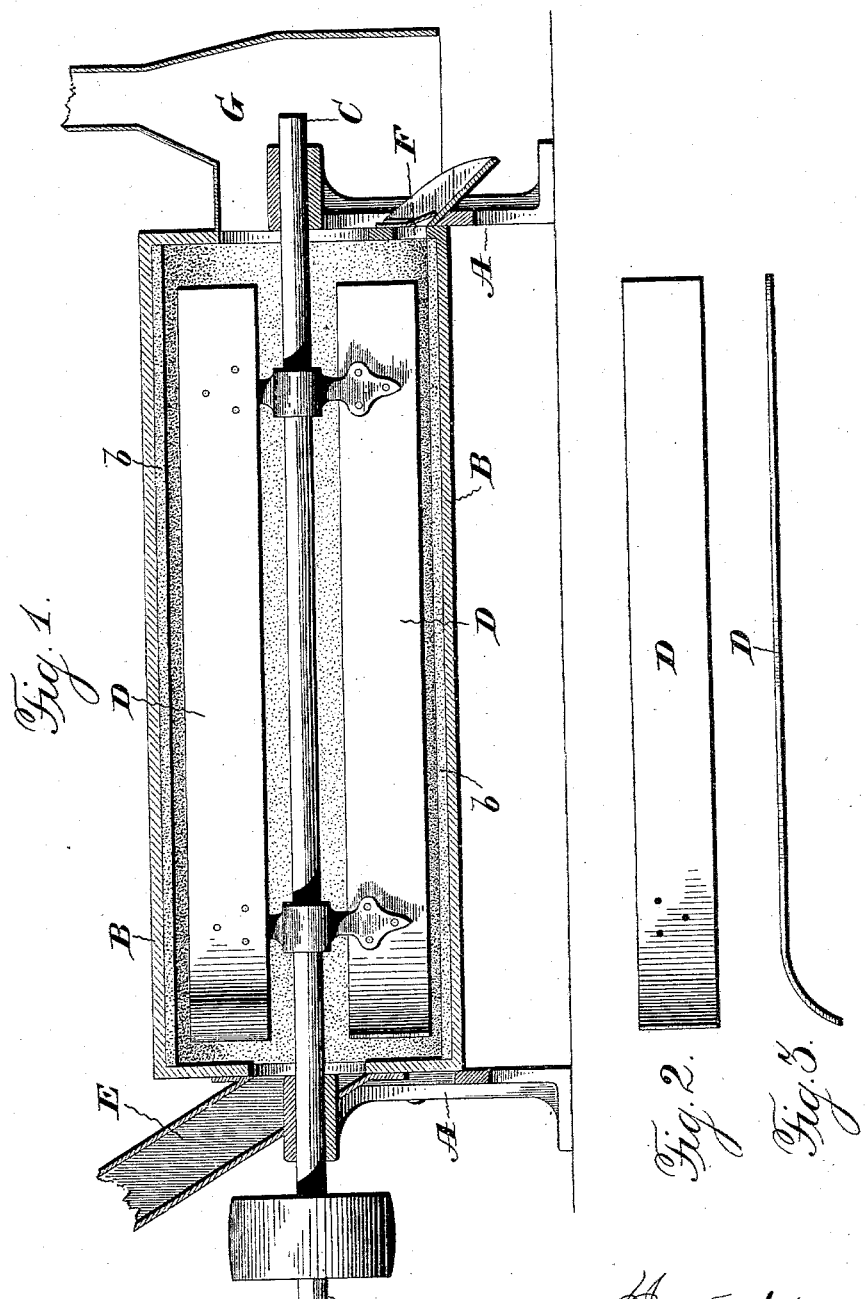

JAMES J. FAULKNER, OF MEMPHIS, TENNESSEE, ASSIGNOR, BY DIRECT AND MESNE ASSIGNMENTS, TO THE STANDARD COTTON SEED COMPANY, OF ARKANSAS.

COTTON-SEED DELINTER.

SPECIFICATION forming part of Letters Patent No. 556,665, dated March 17, 1896.

Application filed June 10, 1895. Serial No. 552,303. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton-seed, and particularly to improvements in that class thereof known as "delinters;" and it consists in the improved construction and arrangement of parts which will be hereinafter described and particularly pointed out in the claim.

In an application filed by me on June 3, 1895, Serial No. 551,560, I have described a cotton-seed delinter in which the removal of the lint from the seed under treatment is effected by causing the seed to assume a rapid centrifugal movement in a casing whose inner surface is lined with a smooth abrading material, the lint separated by the action of the machine being removed by a central air-current.

My present invention belongs to the same class of delinters as that described in the above-referred-to application; but whereas in said application the passage of the seed through the machine was caused by a gradual lessening in width of the rotating blades which induced centrifugal movement of the seed as the discharge end of the machine was reached, and by the spiral formation of such blades, in my present machine I aim to insure the passage of the seed through the machine by curving the ends of the rotating blades at the feed end of the machine. Thereby I induce the passage of the seed through the machine and also cause the seed to be constantly fed into the machine.

My invention is fully represented in the drawings which accompany and form a part of this application, in which the same reference-letters refer to the same or corresponding parts, and in which—

Figure 1 is a central longitudinal section of my machine; and Figs. 2 and 3, side and edge views, respectively, of the rotating blades which cause the centrifugal motion of the seed.

Referring to the drawings, A represents the machine-frame, in which is supported the casing B, whose inner surface is lined with a smooth abrading material $b$. It is a matter of essential importance in this class of delinters that the abrading-surface be perfectly smooth in order that no opportunity be offered for the seed to hang in any one portion of the cylinder and prevent the onward passage of the seed. I preferably form such abrading-surface of finely-ground emery, that being the best material for the purpose with which I am acquainted.

Centrally within the casing upon the central shaft C is supported a series of rotating blades D, which are arranged longitudinally upon the central shaft, and by their rapid rotation cause the seed fed into the machine through the feed-spout E to assume a rapid centrifugal movement around the inner surface of the casing. The abrading action which results produces a scouring of the seed, which causes the instantaneous removal from the surface of the seed presented to the abrading action of all lint adhering thereto. The rotating blades D constantly break up and vary the formation of the roll formed by the seed in the machine and thus cause new surfaces of the seed to be presented to the abrading action, insuring the complete removal of the lint from the seed before it is discharged through the discharge-opening F. The lint as rapidly as it is removed from the seed is swept away through the air-flume G by an air-current caused to exist therein.

The feature of this machine in which my present invention resides lies in curving the feed end of the revolving blades D, as shown in Figs. 2 and 3. When the blades are in operation, the curved portion thereof induces a positive feeding of the seed into the machine and the forward passage of the seed therethrough, thus governing and controlling the action of the machine. This manner of controlling the action of the passage of the seed through the machine is of the simplest nature possible, but is very efficient.

Having thus fully described my invention, what I claim as new, and desire to secure by Letters Patent, is—

In a cotton-seed delinter, the combination with a casing having its inner surface lined with an abrading material, of seed inlet and discharge openings, a central shaft and longitudinally-arranged blades mounted thereon, said blades being curved at the feed end of the machine and straight throughout the remaining portion, whereby said blades in their rotation cause the seed under treatment in the machine to assume the form of a roll upon the surface of the casing, and also cause the formation of an air-current by means of which the lint separated from the seed by action of the machine is removed, substantially as described.

In testimony whereof I affix my signature in presence of two witnesses.

JAMES J. FAULKNER.

Witnesses:
R. W. RAMSEY,
JOHN HALLUM.